No. 668,566. Patented Feb. 19, 1901.
A. C. SAGE.
CONVERTIBLE VEHICLE.
(Application filed Dec. 31, 1900.)
(No Model.)
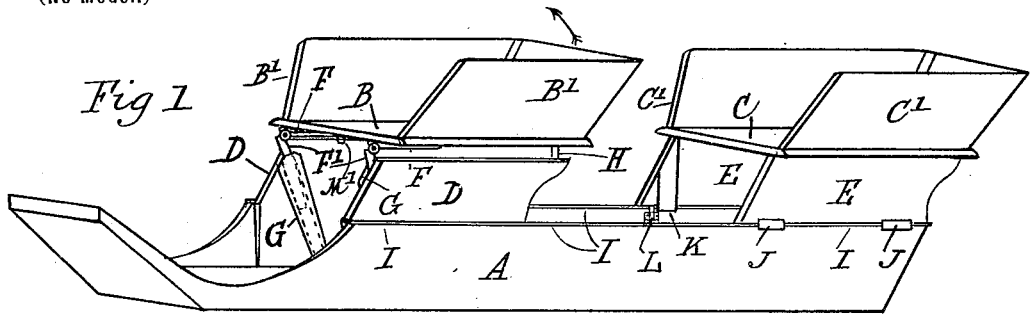
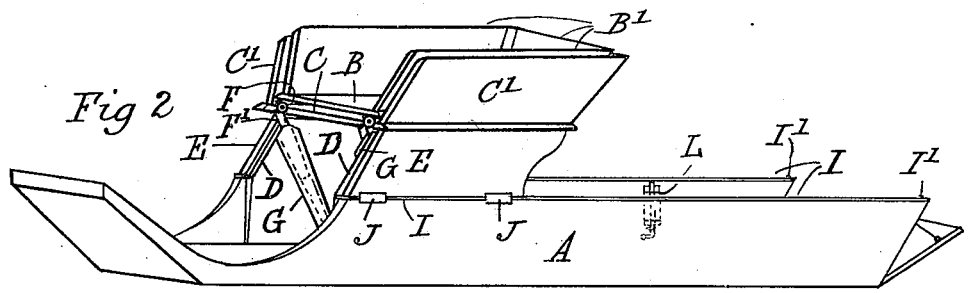
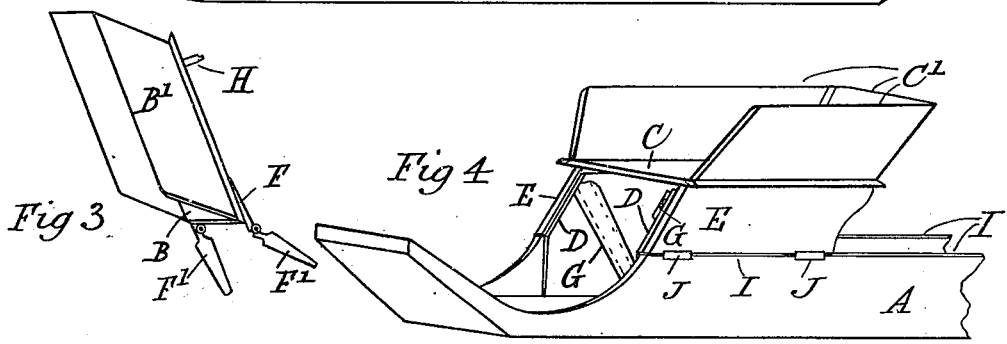
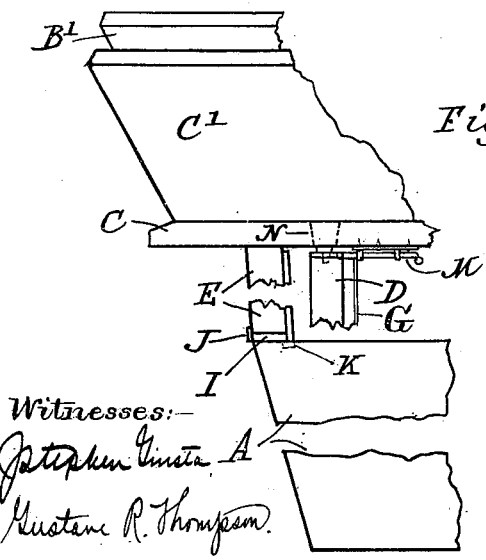
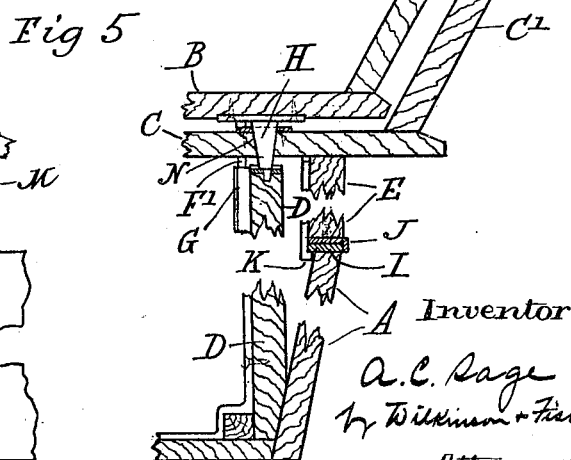
Witnesses:
Inventor:
A. C. Sage
by Wilkinson & Fisher
Attorneys.

UNITED STATES PATENT OFFICE.

ALFRED CRACE SAGE, OF ABBOTSFORD, VICTORIA, ASSIGNOR TO GEORGE GARIBALDI TURRI, OF MELBOURNE, VICTORIA.

CONVERTIBLE VEHICLE.

SPECIFICATION forming part of Letters Patent No. 668,566, dated February 19, 1901.

Application filed December 31, 1900. Serial No. 41,672. (No model.)

*To all whom it may concern:*

Be it known that I, ALFRED CRACE SAGE, a subject of the Queen of Great Britain and Ireland, residing at Johnston street, Abbotsford, in the Colony of Victoria, Australia, have invented certain new and useful Improvements in Convertible Vehicles; and I do hereby declare the following to be a full, clear, and exact description of the invention, such as will enable others skilled in the art to which it appertains to make and use the same.

This invention relates to vehicles which by a readjustment of the parts are convertible (with ease and without sacrifice of rigidity) from double-seated into single-seated, and conversely, various distinct effects being attainable, as set forth below.

These improvements in vehicles relate in part to the bodies, but principally to the arrangement and mode of attachment and support of the seats.

The invention is desirable for buggies or wagons for farmers, commercial travelers, and others who have to carry goods or luggage, as it does not reduce, but increases, the goods-carrying capacity when the two seats of the vehicle are adjusted to the single-seat position. In either of its adjustments the vehicle would not appear to the casual observer to be convertible. The seats are arranged so that all the occupants face the front, and at no time is either seat after adjustment turned upside down. Each seat may be made thoroughly solid and comfortable by being fixedly and permanently siderailed at back and sides, have a squab, and be of full width, although the rear seat (which may, if desired, be hooded) is the wider. The rear seat is arranged (various means being available) so that it, with its attachments, may be moved bodily into a position partly under and partly outside of the position the front seat normally occupies, the front seat nesting with the other, so forming a single-seated vehicle for the time being. The "front" seat, by which expression I shall indicate the seat which when in use is more or less in front, may have means for detachment from the vehicle when required, allowing the other seat to be used by itself at the front. The front seat (detachable or otherwise) is supported at such a height as always to allow space under it sufficient to permit the other seat (which in this specification is called the "rear" seat) to occupy its front position aforesaid, whereby a single-seated vehicle is formed. The front-seat supports are located at or near its front (and generally, also, its rear) and are either jointed or not, as explained below. The easy movement of the rear seat may be facilitated by rollers, if desired, and that seat may also be slipped off or detached, if required. As shown in the drawings herewith, the most convenient means of providing for the movement of the rear seat is to rest any suitable supports of that seat upon rails upon and extending from the front to the rear of the body, and the most convenient means of support of the front seat are also shown in the drawings; but the scope of the invention is not limited to those means.

Referring now to the accompanying drawings, Figure 1 is a perspective sketch of part of a vehicle constructed according to my invention, showing the position the seats occupy as a two-seat vehicle. The seats are shown each with sides and back; but no cushions or metal rails are shown. Fig. 2 is a perspective sketch of the parts in Fig. 1 when two seats are nested together. Fig. 3 is a perspective sketch of a front seat. Fig. 4 is a perspective sketch of the front part of the vehicle, with the rear seat located at the front, the front seat proper being detached. Fig. 5 represents a rear elevation (partly in vertical section) of the vehicle when the two seats are nested together.

In the drawings a vehicle-body is shown (marked A) with front seat B and a rear seat C, which is lower and wider than seat B, and the supports E of (and attached to) seat C rest upon the body A and are farther apart than the supports D, (of the front seat B,) attached to or forming part of body A.

B' represents any suitable sides and back of seat B, and C' the same of seat C.

The two seats may be nested by moving forward seat C and its attached supports E, sometimes called "risers." To accomplish this forward motion, it is sufficient for each upper edge of the side of body A to be a rail I, (usually of metal,) on which rails risers E rest and may slide. To keep the risers on the rails, suitable means are provided, as small bearing-plates secured to the risers and having an angle or lip J to bear against the side of rail I, as shown. The front seat B has at each side of the front of that seat supports having two members, one, F, attached to the seat and one, F', to the vehicle sides or frame of body A. In order that the seat may be removable, one of the members, as F', of each support is not permanently attached, but simply fits into a socket, as G, fastened in the required position, in the case shown to the supports D. The members F support seat B clear above risers D and high enough to allow room for seat C between B and D. As it is possible to do without raising seat B, a joint or hinge at the junction of members F and F' is not essential; but it is preferred and is shown, and it enables seat B to be tilted upward from the rear (indicated by an arrow in Fig. 1) until when it passes the perpendicular it may rest on knuckle-joints, as is partly illustrated in Fig. 3, in which, however, one member F' is shown inclined differently from the other to exhibit the joint more clearly. After the seat C has been moved to the forward position seat B is returned to its normal position, as in Fig. 2. Seat B may not always need rear supports; but in practice they are advisable, and pedestals H are shown, with the base of each resting on a riser D or passing through a hole in a metal plate on the risers. As these pedestals pass through seat C when the latter is forward, the latter has apertures N therein to allow thereof, Fig. 5. If the rear of seat B did not lift up, any pedestals H would need to be jointed or movable out of the way of seat C during the movement of the latter to its forward position, or the pedestals may end in rollers.

In addition to the bearing-plates with lip J plates having each a lip K on the side opposite to lip J may (to keep risers E down to the rails) be provided, the lips K coming under a projecting edge of rail I. At each end of the rails I any projection, as the head of a screw I', (shown at the rear in Fig. 2 only,) will serve to prevent seat C being wholly detached until the screw or like obstruction is removed.

To keep seat C in place in its rearmost position or as much farther forward as desired, any usual means are provided, as bolt L or a series of such bolts, at suitable points inside body A to engage risers E, or there might be outside bolts or set-screws and sockets, as will be well understood. In the forward position of seat C the pedestal H will lock that seat against movement; but an additional bolt M under seat C to engage riser D is sometimes used, as shown in Fig. 5. The hole it enters in D is also shown at M' in Fig. 1.

The space below the front seat for the reception of the rear seat may be temporarily filled, if desired, by any suitable movable panels; but the use of that and of other obvious minor modifications will not depart from the spirit of my invention or the scope of my claims.

What I claim as my invention, and desire to secure by Letters Patent of the United States, is—

1. The combination with a carriage-body provided with sockets, of a detachable and tiltable seat provided with supports hinged thereto, which supports are adapted to fit into said sockets, substantially as described.

2. The combination of a carriage-body having risers, sockets secured to said body and risers, a detachable and tiltable seat provided with fixed supports at the rear and with hinged supports at the front, said hinged supports being adapted to engage with said sockets and yet to be freely removable therefrom, substantially as described.

3. The combination of a carriage-body provided with risers, elongated sockets carried by said body and risers, a detachable and tiltable seat provided with fixed projections at its rear adapted to rest upon said risers and support said seat at a distance therefrom, said seat being also provided with rigid arms adapted to fit into said sockets, said arms being hinged to the front of said seat and supporting the front of said seat at a distance above said risers, and a rear seat which is lower and wider than said first seat, substantially as described.

In testimony whereof I affix my signature in the presence of two witnesses.

ALFRED CRACE SAGE.

Witnesses:
   I. S. HOBDAY,
   I. H. HOBDAY.